Inventor:
George T. Wolf,
by Attorney.

United States Patent Office 3,528,103
Patented Sept. 8, 1970

3,528,103
INDUCTION MOTOR AND STARTING AND REVERSING CIRCUIT THEREFOR
George T. Wolf, Schenectady, N.Y., assignor to General Electric Company, a corporation of New York
Filed Jan. 11, 1968, Ser. No. 697,224
Int. Cl. H02p 1/40, 1/44
U.S. Cl. 318—207                                         12 Claims

ABSTRACT OF THE DISCLOSURE

A bilateral semiconductor switching device is utilized to provide the starting winding of a single phase induction motor with line voltage during the starting condition of the motor and to achieve rapid reversal of rotation without need to open or close high current contacts. The gate signal for the semiconductor switching device is provided by a pickup coil sensing the current in the main winding, the signal being greater than the threshold of the level of the semiconductor device until the operating speed of the motor is reached. To accomplish rapid reversal of rotation, the start winding polarity is set during the time that the semiconductor switching device is in a high impedance state, and the reversal is initiated by momentarily applying to the gate of this bilateral semiconductor switching device energy from the opposite power terminal.

BACKGROUND OF THE INVENTION

My invention relates to an induction motor starting and reversing circuit, and particularly to such a circuit that has improved and relatively rapid operation.

Single phase induction motors are extensively used in many different applications, such as household appliances. The single phase induction motor generally includes an auxiliary or starting winding which accepts current from the line with a different phase angle relative to the current in the main winding. When both the main and auxiliary windings are initially excited, a rotating magnetic field is established in the stator. Penetration of this flux into the rotor induces eddy currents in the rotor conductors thereby establishing a magnetic field in the rotor. During this initial period the rotor is accelerated by the interaction of the stator and rotor fields until a speed determined by the internal losses of the motor and the load is attained. At this point or slightly earlier, a switch actuated, usually by a centrifugal type of mechanism, opens the starting winding circuit to remove the start winding from the line. Also, semiconductor switching circuits, as for example, starting circuits as disclosed in U.S. Pat. No. 3,116,445 granted to F. H. Wright have been utilized to accomplish this function. It will be understood, of course, that these conventional mechanical or semiconductor starting switching devices are not used to reverse the direction of rotation of the motor.

Generally, the motor rotation reversing function is accomplished by opening and closing electrical contacts. Where the switching function is carried out when the motor is under a heavy load, the electrical switching contacts must, of course, be capable of relatively heavy current and are subject to arcing and deterioration. In some automatic washer applications, this problem is somewhat minimized by disconnecting the motor from the line for a 50–60 second time interval for rotation reversal. During this interval when the motor is not energized, the terminals of the start winding are reversed by a timer cam. Although in such applications the opening and closing of electrical contact with a substantial current flow in the starting winding is avoided, a time delay, the interval necessary to assure the motor is not energized, is required in order to effect a change in the direction of rotation. During this interval no useful function is being performed by the appliance. It is desirable, therefore, that the rotation reversal function be carried out without interrupting the power to the motor and without a delay intreval. It is, of course, always desirable to eliminate the need for any type of mechanical switching contacts that must handle relatively high currents since such devices are subject to arcing and contribute to maintenance problems.

Accordingly, it is a general object of my invention to provide an improved induction motor with a starting and reversing circuit.

A more specific object of my invention is to provide an improved induction motor circuit arrangement wherein reversal of the direction of rotation of the motor can be achieved without need for removing power from the motor.

Another object of the present invention is to provide an improved electrical motor wherein the reversal of the direction of rotation of the motor can be accomplished without the need for electrical contacts capable of handling relativelly high currents.

It is a still further object of my invention to provide an improved motor circuit wherein reversal of the direction of rotation of the motor can be effected without the need for a time delay period.

Another object of my invention is to provide an improved induction motor circuit wherein rapid reversal of the direction of rotation of an induction motor is achieved without switching relatively high currents through mechanical contacts.

SUMMARY OF THE INVENTION

In accordance with one form of my invention, I have provided an improved induction motor having a start winding that is energized by a bidirectional or bilateral semiconductor switching device. A means for sensing current in the main winding, such as a coil, and producing a control signal in response to the current flow in the main winding is coupled with the control input of the bidirectional semiconductor switching device to activate the bidirectional semiconductor switching means to a high impedance state when the motor reaches a predetermined speed. To achieve a reversal of the direction of rotation of the motor, a momentary reversing signal is applied to the bidirectional semiconductor switching device. Once the motor reverses direction and builds up speed in the desired reverse direction, the signal from the sensing means is reduced so that the semiconductor switching device is activated to a high impedance state.

In other words, when the motor is initially energized for operation in a predetermined direction there is a large current flow through the main winding. Thus the sensing means produces a large control signal, above a predetermined level, which is applied to the gate of the bidirectional semiconductor switching means. This causes the switching means to present a low impedance in the circuit of the start winding selectively to energize it. When the motor comes up to operational speed the main winding current drops to a low level and thus the control signal drops below the predetermined level. The bidirectional semiconductor switching means then presents a very high impedence in the circuit of the start winding, effectively deenergizing it.

An important advantage of the improved motor circuit is that rapid reversal of rotation can be accomplished without the need to open or close high current contacts. The running torque characteristics of the motor are not affected by the circuit.

The subject matter which I regard as my invention is particularly pointed out and distinctly claimed in the claims. The structure and operation of my invention, together with further objects and advantages, may be better understood from the following description give in connection with the accompanying drawings.

DESCRIPTION OF THE PREFERRED EMBODIMENTS

Figure 1:
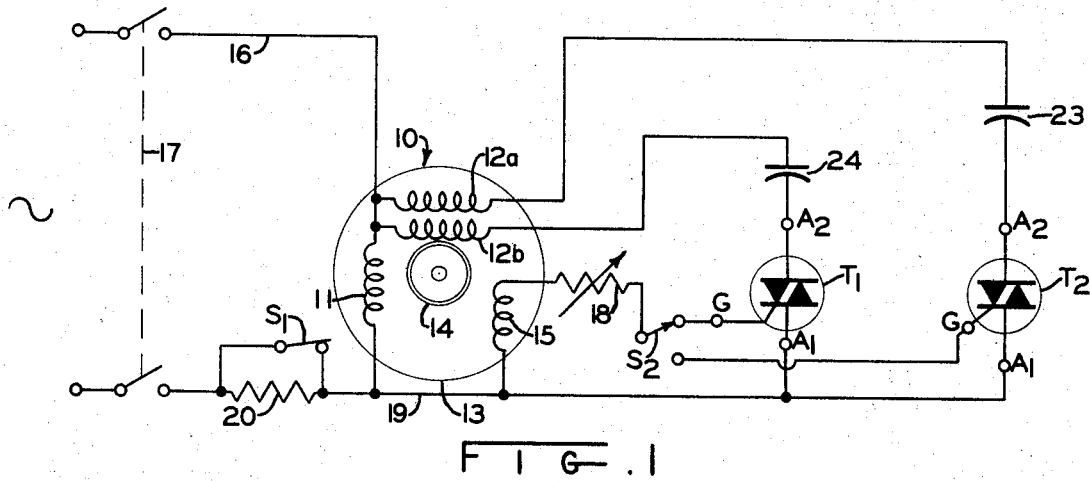
FIG. 1 shows a schematic circuit diagram of a motor illustrating an embodiment of the invention wherein two bidirectional semiconductor switching devices and two start windings are employed.

With reference to FIG. 1, I have shown an induction motor 10 which is provided with a main or running primary winding 11 and two auxiliary or start windings 12a, 12b which are positioned on a stator 13 of the motor 10. The motor 10 includes a rotor 14 of any suitable type, such as a laminated structure carrying a squirrel cage winding that is supported for rotation with respect to the stator 13. The start windings 12a, 12b are arranged with respect to each other and with respect to the main winding 11 so that energization of the start winding 12a tends to cause the rotor 14 to rotate in one direction, and energization of the start winding 12b tends to cause the rotor 14 to rotate in an opposite direction i.e., the start windings 12a and 12b are oppositely arranged. One end of the main winding 11 and one end of each of the two start windings 12a, 12b are connected to a supply lead 16 which, in turn, is connected through one side of a line switch 17 to a suitable source of alternating current potential. The other end of the main winding 11 is connected to a supply lead 19. The lead 19 is connected through a normally closed reversing switch $S_1$ which, in turn, is connected through the other side of the line switch 17 to the source of alternating current potential. The reversing switch $S_1$ is shunted by a resistor 20 to reduce contact arcing.

The motor 10 includes a sensing winding 15 which is positioned on the stator 13. The sensing winding 15 is arranged to sense the magnetic field established by the main winding 11. The main requirement for the sensing winding 15 is that it be suitably designed and positioned to sense the magnetic field provided by the main winding 11. One end of the sensing winding 15 is connected to the lead 19, and the other end is connected to the movable arm or contact of a two position direction determining switch $S_2$ having two fixed contacts. A variable resistor 18 may be connected in series with the sensing winding 15 to provide an adjustment for the voltage produced by the sensing winding 15.

The two start windings 12a, 12b are connected in respective starting circuits. These starting circuits comprise a bidirectional semiconductor switching device such as a Triac or Triac device $T_1$ or $T_2$. The Triac is a bidirectional current conducting type of semiconductor switch which is known in the art. As illustrated in the figures of the accompanying drawing, the Triac comprises two anodes $A_1$ and $A_2$, and a gate or gate electrode G. The Triac provides a main current path between its two anodes $A_1$ and $A_2$. Normally, this main current path presents a relatively high impedance in the absence of gating or firing current supplied between the gate G and the anode $A_1$. However, if an appropriate firing signal is applied to the gate G to cause gate current to flow between the gate G and the anode $A_1$, the main current path presents a relatively low impedance and permits current to flow in both directions through the main current path between the anodes $A_1$ and $A_2$. This bidirectional current flow is indicated by the two diode rectifier symbols in the Triac symbol in the figures. When gate current is removed from the gate G and the anode $A_1$, the Triac again presents a relatively high impedance and its main current path appears effectively open.

The other end of the start winding 12a is connected through a phase shifting capacitor 23 and the Triac $T_2$ to the lead 19, and the other end of the start winding 12b is connected through a phase shifting capacitor 24 and the Triac $T_1$ to the lead 19. The gates G of the two Triacs $T_1$ and $T_2$ are respectively connected to the fixed contacts of the direction switch $S_2$. The phase shifting capacitors 23, 24 may be omitted if the start windings 12a, 12b have sufficient resistance to cause a phase shift through their respective start windings 12a, 12b.

With the reversing switch $S_1$ in its normally closed position, and with the arm of the direction switch $S_2$ engaging the upper contact connected to the gate G of the Triac $T_1$, it is assumed that the motor 10 is stopped. If the motor 10 is to be started, the line switch 17 is closed. This energizes the main winding 11 which, because the rotor 14 is stopped, receives a heavy surge of current which produces a relatively high or large magnetic flux. This flux produces a voltage of sufficient magnitude across the sensing winding 15 to cause current to flow between the gate G and the anode $A_1$ of the Triac $T_1$. This causes the Triac $T_1$ to conduct or fire so that current flows through the respective start winding 12b. With current flowing in the main winding 11 and in the start winding 12b, the rotor 14 begins to rotate in a given direction determined by the position and arrangement of the start winding 12b. Gradually, the rotor 14 builds up speed until a point is reached where the flux produced by the main winding 11 falls to a level such that the sensing winding 15 no longer produces sufficient voltage to cause the Triac $T_1$ to conduct. The Triac $T_1$ is turned off and the start winding 12b is de-energized. However, the motor continues to operate in the given direction.

If the direction of rotation of the rotor 14 is to be reversed, the arm of the direction switch $S_2$ is first moved to its lower contact connected to the gate G of the Triac $T_2$. This action has no effect, but the new position of the arm of the switch $S_2$ will, as hereinafter explained, serve to energize the start winding 12a. When reversal is to be provided, the reversing switch $S_1$ is momentarily opened. Arching at the contacts of the switch $S_1$ is reduced or eliminated by the resistor 20. When the switch $S_1$ is opened, the current through the main winding 11 is interrupted so that the rotor 14 slows down. With the rotor 14 slowed down, and the switch $S_1$ closed again, the main winding 11 draws more current to build up speed so that sufficient magnetic flux is produced to cause the sensing winding 15 to produce sufficient voltage to fire the Triac $T_2$. When the Triac $T_2$ fires, the start winding 12a is energized. The energized start winding 12a tends to cause the rotor 14 to rotate in the opposite direction so that the rotor 14 slows down in its former direction of rotation, stops, and then begins to rotate in the opposite direction. During this slowing down, stopping, and starting in the opposite direction, the main winding 11 produces sufficient magnetic flux to cause the sensing winding 15 to produce a firing voltage that keeps the Triac $T_2$ turned on. Eventually, the rotor 14 builds up speed in the now reversed direction until the main winding 11 draws a sufficiently low current to remove the firing voltage from the sensing winding 15. At this time, the Triac $T_2$ is turned off. However, the rotor 14 continues to rotate in the now reversed direction.

If the rotor 14 is to be reversed again, this may be accomplished by connecting the arm of the direction switch $S_2$ to the gate G of the Triac $T_1$, and momentarily opening the reversing switch $S_1$. The same cycle just described takes place, and the motor slows down, stops, and starts again in the opposite direction. It will thus be seen that my induction motor starting and reversing circuit provides a relatively simple, yet effective and rapid, arrangement for reversing and starting an induction motor. The Triac turned on for a reversal is automatically turned off by the sensing winding 15 when the desired speed is reached.

Figure 2:
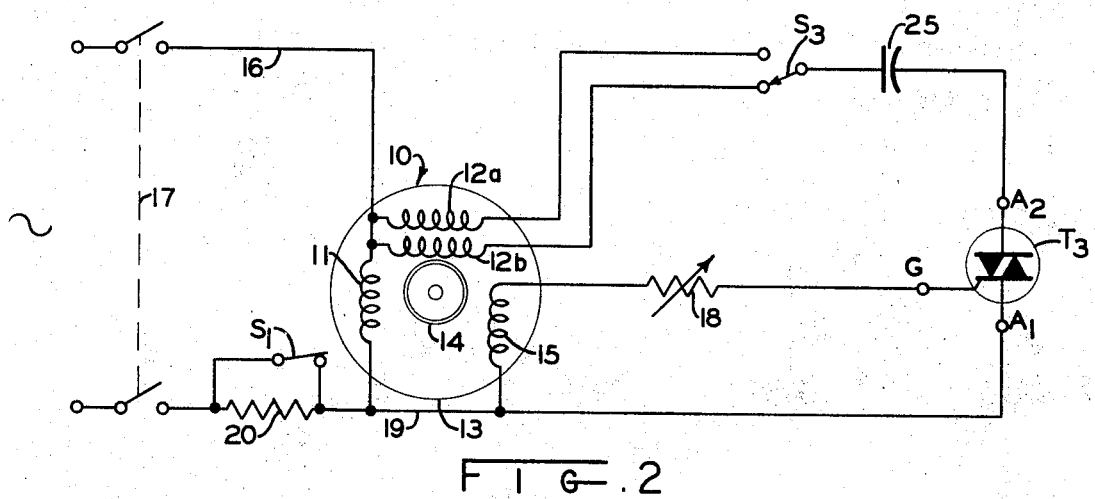
FIG. 2 shows an embodiment of my invention corresponding to the embodiment of FIG. 1 wherein one bidirectional semiconductor switching device is employed.

FIG. 2 shows another embodiment of my invention which is similar to the arrangement of FIG. 1, but which requires only one Triac $T_3$ and one phase shifting capacitor 25. In FIG. 2, a two position direction determining switch $S_3$ has its fixed contacts connected to the start windings 12a, 12b respectively, and has its movable arm connected through a phase shifting capacitor 25 to the anode $A_2$ of a Triac $T_3$. The anode $A_1$ of the Triac $T_3$ is connected to the lead 19. The gate G of the Triac $T_3$ is connected to the sensing winding 15. Thus, in FIG. 2, the main current path of the Triac $T_3$ is selectively connected to one of the two start windings 12a, 12b, and its gate G is continuously connected to the sensing winding 15. With the switches $S_1$ and $S_3$ in the positions shown, the motor 10 is turned on by closing the line switch 17. This causes current to flow in the main winding 11. The sensing winding 15 senses this current, and produces a voltage that turns the Triac $T_3$ on to energize the start winding 12b. Rotation of the motor 10 begins, and after some speed is reached, the voltage produced by the sensing winding 15 falls to a magnitude so that the Triac $T_3$ is turned off. If the motor 10 is to be reversed, the movable arm of the switch $S_3$ is moved to the contact associated with the start winding 12a. Then, the reversing switch $S_1$ is momentarily opened so that the motor 10 slows down, and the switch $S_1$ is then closed. This causes the sensing winding 15 to produce a voltage that causes the Triac $T_3$ to conduct starting current through the start winding 12a. Current through the start winding 12a causes the motor 10 to slow down, stop, and then begin to rotate in the opposite direction. The Triac $T_3$ is kept turned on by the sensing winding 15 until the motor 10 rotates in the new direction at a speed sufficient to remove the firing signal from the gate G. Reversal of the motor 10 may be provided again by changing the position of the switch $S_3$, and momentarily opening the switch $S_1$. Thus, the motor 10 may be rapidly reversed by positioning the switch $S_3$ and then momentarily opening the switch $S_1$.

Figure 3:
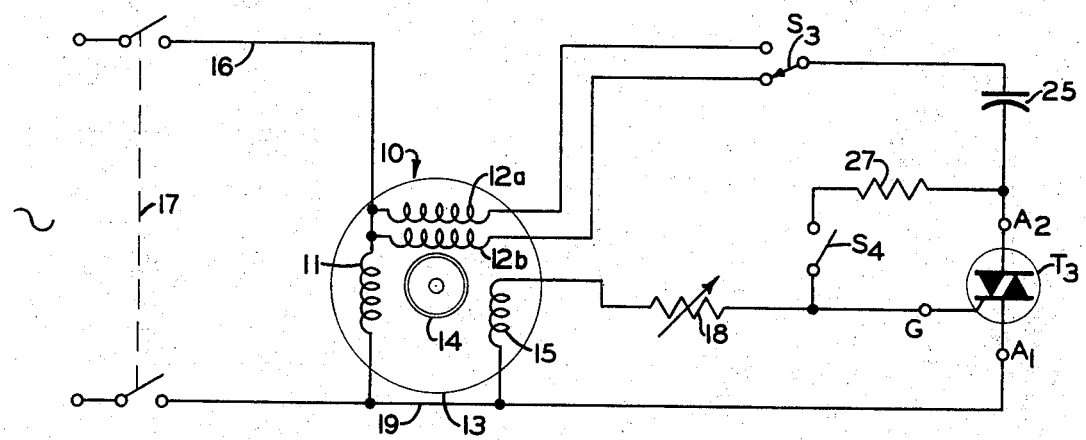
FIG. 3 is a schematic circuit diagram corresponding to the one shown in FIG. 2 wherein the reversing switch is connected across the gate and anode of the bidirectional switching device.

FIG. 3 shows another embodiment of my induction motor starting and reversing circuit which is similar to FIG. 2. However, in FIG. 3, the reversing switch $S_1$ and its resistor 20 on the line side of the motor 10 have been removed, and a normally open reversing switch $S_4$ and resistor 27 have been connected in series between the anode $A_2$ and the gate G of the Triac $T_3$. The reversing switch $S_4$ accomplishes the same function as the reversing switch $S_1$ in FIGS. 1 and 2, except that initiation of a reversal is produced by momentarily closing the switch $S_4$. With the direction switch $S_3$ in the position shown and with the switch $S_4$ open, the motor 10 is started by closing the line switch 17. This causes the sensing winding 15 to produce a firing signal that turns the Triac $T_3$ on. Conduction of the Triac $T_3$ energizes the start winding 12b so that the motor 10 begins to rotate in a given direction. Once the motor speed reaches a predetermined point, the Triac $T_3$ is turned off. If the motor 10 is to be reversed, the arm of the switch $S_3$ is connected to the other contact. Then, when reversal is to take place, the switch $S_4$ is momentarily closed so that a turn on signal is provided from the line voltage at the anode $A_2$ through the resistor 27 and the momentarily closed switch $S_4$. This turns the Triac $T_3$ on. When the Triac $T_3$ begins to conduct, the start winding 12a is energized which opposes the direction of rotation of the motor 10. The motor 10 slows down so that the main winding 11 produces sufficient flux which in turn causes the sensing winding 15 to produce a voltage that keeps the Triac $T_3$ turned on. The motor 10 slows down more, stops, and then rotates in the opposite direction. Eventually, the motor speed builds up so that the voltage provided by the sensing winding 15 falls and the Triac $T_3$ turns off. Reversal can be provided again by moving the arm of the switch $S_3$ and momentarily closing the switch $S_4$.

It will thus be seen that the embodiments of FIGS. 1, 2, and 3 provide an improved, and relatively rapid starting and reversing circuit that turns on a bidirectional semiconductor device to energize an appropriate start winding while the motor is operating. The motor is rapidly slowed down, stopped, and started in the opposite direction, and the start winding is then de-energized.

Figure 4:
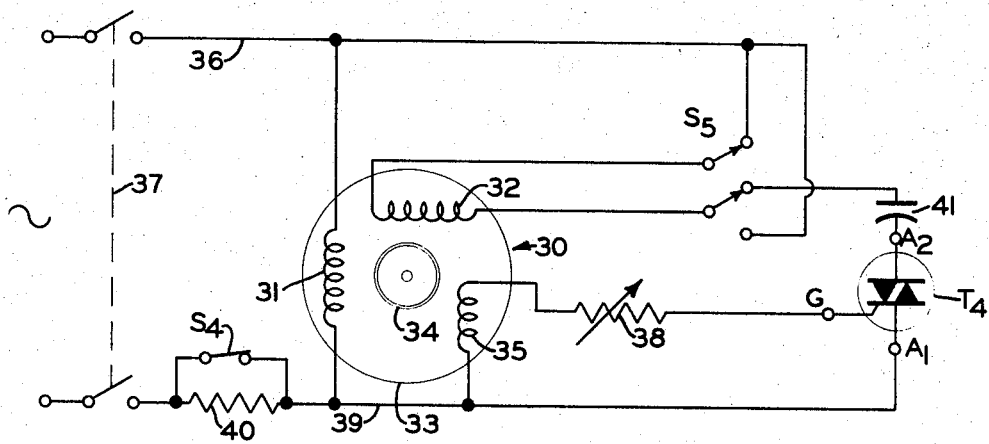
FIG. 4 is a schematic circuit diagram of another embodiment of the invention wherein a single start winding is utilized.
Figure 5:
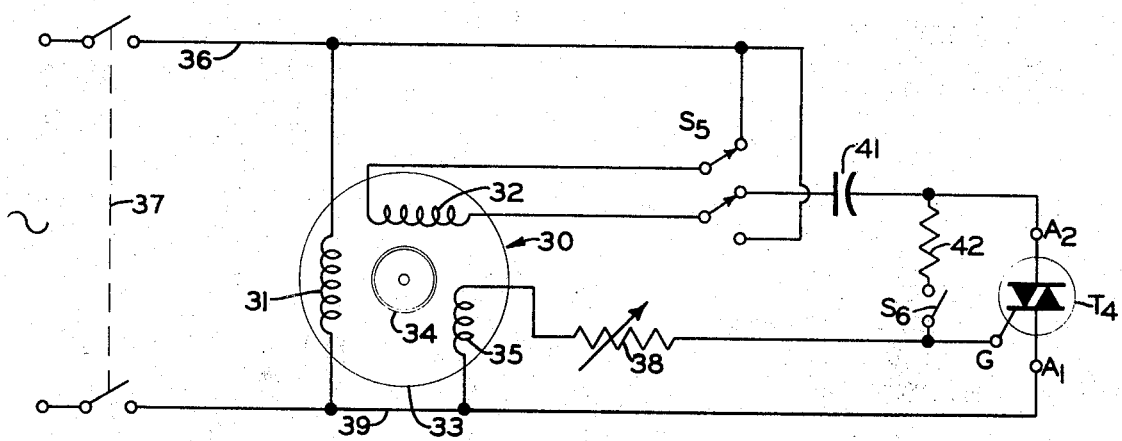
FIG. 5 is a schematic circuit diagram corresponding to the circuit diagram of FIG. 4 wherein the reversing switch has been connected across a gate and anode of the bilateral switching device.
Figure 6:
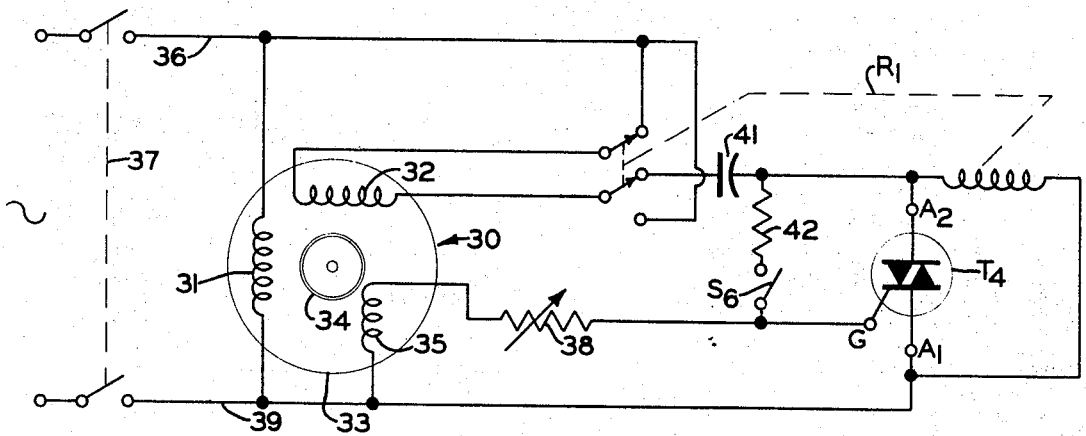
FIG. 6 is a schematic circuit diagram corresponding to the one shown in FIG. 4 wherein a relay is employed to reverse rotation of the motor.

FIGS. 4, 5 and 6 show embodiments of an induction motor starting and reversing circuit in accordance with my invention which require only a single start winding. In FIG. 4, an induction motor 30 is provided with a main winding 31 having one end connected to a supply lead 36 and the other end connected to a supply lead 39. A start winding 32 and a sensing winding 35 are also provided. The windings 31, 32, 35 are suitably positioned on a stator 33, and a rotor 34 is positioned with respect to the stator 33 to provide a secondary winding which may take any form, such as a laminated squirrel cage type of construction. The lead 39 is connected to a normally closed reversing switch $S_4$ that is shunted by resistor 40. The motor 30 is suitably energized by a source of alternating current potential through a line switch 37. The start and reversing winding 32 is connected to the two movable arms of a direction switch $S_5$ which may take two positions. The upper and lower contacts of the switch $S_5$ are connected to the lead 36, and the intermediate or middle contact of the switch $S_5$ is connected through a phase shifting capacitor 41 to the anode $A_2$ of a bidirectional semiconductor switching device such as the Triac $T_4$. The anode $A_1$ of the Triac $T_4$ is connected to the lead 39. The gate G of the Triac $T_4$ is connected to the sensing winding 35 through a variable resistor 38. With the switches $S_4$ and $S_5$ in the positions shown, the motor 30 is turned on by closing the line switch 37. This causes the sensing winding 35 to produce a firing voltage that turns the Triac $T_4$ on so that the start winding 32 is energized in a given direction relative to the main winding 31. The motor begins to operate and eventually reaches a predetermined speed, after which the Triac $T_4$ is turned off by the voltage at the sensing winding 35 falling below a predetermined magnitude. If the direction of rotation of the motor 30 is to be reversed, the movable arms of the switch $S_5$ are shifted to their lower position. Then, when reversal is to take place, the switch $S_4$ is momentarily opened. This slows the motor 30 down, with the result that the sensing winding 35 produces a voltage that turns the Triac $T_4$ on. This energizes the start winding 32 which is connected in an opposite sense relative to the main winding 31 because of the change in the switch $S_5$. This energization of the start winding 32 slows the motor 30 down, stops the motor 30, and causes rotation in the opposite direction. When the motor 30 reaches speed in the opposite direction, the Triac $T_4$ is turned off. Subsequent reversal may be provided by again changing the switch $S_5$ and momentarily opening the switch $S_4$. Thus, the embodiment of FIG. 4 provides starting and reversal with a single start winding 32.

FIG. 5 shows another embodiment of the motor 30 having a single start winding 32. The embodiment of FIG. 5 is similar to the embodiment of FIG. 4, but the reversing switch $S_4$ and resistor 40 have been removed, and a reversing switch $S_6$ and a series resistor 42 have been connected between the anode $A_2$ and the gate G of the Triac $T_4$. The switch $S_6$ and resistor 42 function in the same manner as the switch $S_4$ and resistor 27 in FIG. 3. The switch $S_6$ is a normally open switch which is momentarily closed to effect reversal. With the switches $S_5$ and $S_6$ in the position shown, the motor 30 is started by closing the line switch 37. The start winding 32 is energized by the Triac $T_4$ which is turned on by the voltage from the sensing winding 35. When reversal is to take place, the arms of the switch $S_5$ are moved to the appropriate contacts, and the switch $S_6$ is momentarily closed. This causes the Triac $T_4$ to be turned on and energize the start winding 32 in a reverse sense so as to slow the motor 30 down, then stop the motor 30, and start the motor 30 in the opposite direction. During this time, the Triac $T_4$ is kept turned on by a voltage produced by the sensing winding 35. Once a predetermined speed in the reverse direction has been reached, the Triac $T_4$ is turned off. Further reversal may be provided by moving the arms of the switch $S_5$ momentarily closing the switch $S_6$.

In some applications of an induction motor, such as a washing machine or similar appliance, each cycle may require a reverse rotation of the motor. Thus, in a washing operation, the motor may rotate in a forward direction on the odd number cycles and may rotate in a reverse direction in the alternate even numbered cycles. In such applications, the reversing switch $S_5$ shown in FIG. 5 would be alternatively switched from one position to the other for each cycle. This alternate switching may be provided by a relay $R_1$ shown in FIG. 6. The relay $R_1$ comprises an energizing winding or coil connected between or across the anodes $A_2$ and $A_1$ of the Triac $T_4$. Each time this relay coil is energized, it switches its associated contacts from one position to the other position. The relay coil is arranged so that it is energized when the Triac $T_4$ is not conducting or turned off, and is deenergized when the Triac $T_4$ conducts. The contacts associated with the relay coil should be of the make-before-break type to provide a holding current path for the relay winding. With the relay contacts in the position shown and with the switch $S_6$ open, the motor 30 is energized by closing the line switch 37. This causes the sensing winding 35 to produce a voltage that fires the Triac $T_4$ so that starting current is provided in the start winding 32. As the motor 30 builds up speed, a point is reached where the sensing winding 35 does not produce sufficient voltage to keep the Triac $T_4$ turned on. The Triac $T_4$ is then turned off. When the Triac $T_4$ is turned off, the relay coil is or becomes energized so that the movable relay contacts change position. This switching is assured since the contacts are the make-before-break type. Thus, the relay contacts connect the start winding 32 in the reverse direction in the manner described for FIG. 5 when the arms of the switch $S_5$ are manually switched. When the motor 30 is to be reversed, the switch $S_6$ is momentarily closed. This causes the Triac $T_4$ to fire, and provide energizing current in the reverse direction through the start winding 32. This causes the motor 30 to slow down, stop, and begin to rotate in the opposite direction. During this time, the Triac $T_4$ is kept turned on by a suitable voltage supplied by the sensing winding 35. Once the motor speed builds up, the sensing winding 35 produces voltage falls so that the Triac $T_4$ is turned off. When the Triac $T_4$ is turned off, the winding of the relay $R_1$ is again energized so that the contacts associated with the winding are switch to the other position. Thus, the contacts are set for a reverse action which can be brought about by again momentarily closing the switch $S_6$.

It will thus be seen that my invention provides a new and improved induction motor starting and reversing circuit. The circuit permits an induction motor to be rapidly reversed since the appropriate winding may be energized to effect reversal, or the winding may be energized in the appropriate direction to effect reversal. This reversal can be brought about while the motor is rotating, and does not require opening of the line switch with its associated arcing. Since the reversing can be provided by appropriate energization while the motor is rotating in a given direction, the reversal may be provided very rapidly, in the order of a second or less for 60 cycle alternating current.

While I have shown preferred embodiments of my starting and reversing circuit, persons skilled in the art will appreciate that modifications may be made. For example, the exact configuration and position of the sensing winding may take various forms. In some applications, it may be desirable to provide a sensing circuit in electrical series with the main winding. Such a sensing circuit may include a transformer having primary and secondary windings, or may include a reed switch or current sensing device. Various bidirectional switching devices may be used in place of the Triacs. The start circuits may include the phase shifting capacitors shown, or may include resistance windings which provide the necessary phase shift for starting a motor. The switches which are momentarily opened or closed to initiate a reversal may take various forms, such as manual switches, switches operated by a timer, or switches operated by some automatic means. Such automatic means may be provided by an automatic control on an appliance, or by some programmed device such as a punched paper tape. The switches which determined the direction of rotation may also take various forms. Therefore, while my invention has been described with reference to particular embodiments, it is to be understood that modifications may be made without departing from the spirit of the invention or from the scope of the claims.

What I claim as new and desire to secure by Letters Patent of the United States is:

1. An induction motor comprising: a stator having a main winding and start winding means positioned thereon; a rotor member disposed for rotation relative to said stator; means for sensing current in the main winding and producing a control signal in response to sensed current in said main winding; bidirectional current conducting semiconductor switching means having a main current path and a control input for activating said bidirectional switching means in response to a control signal applied to said control input; means connecting said main current path of said bidirectional switching means to said start winding means for selectively energizing said start winding means to cause said rotor member to rotate in a selected direction; means coupling said means for sensing current to said control input of said bidirectional switching means to apply said control signal to said control input for effectively deenergizing said start winding means when said rotor member reaches a predetermined speed; and means coupled to said bidirectional switching means for enabling said bidirectional switch means to energize said start winding means in response to a momentary signal for causing said rotor member to rotate in a reverse direction.

2. The induction motor of claim 1 wherein said start winding means comprises two oppositely arranged start windings and wherein said means connecting said main current path of said bidirectional switching means to said start winding means includes a switch for selectively energizing one of said start windings.

3. The induction motor of claim 1 wherein said start winding means comprises a single start winding, and wherein said means for connecting said main current path of said bidirectional switching means to said start winding means includes a switch means for energizing said start winding means in a selected direction.

4. A starting and reversing circuit for a single phase induction motor having a stator, a main winding positioned on said stator, first and second start windings positioned on said stator in an opposing relation, and a squirrel cage rotor operatively positioned for rotation relative to said stator, said circuit comprising: first and second input leads for connection to alternating current potential; means for connecting said input leads across said main winding and for connecting said first input lead to one end of each of said start windings; a bidirectional current conducting semiconductor switching device having first and second terminals that form a main current path and having a control input, said main current path being in a high impedance state when the input signal at said control input is below a predetermined level and being in a low impedance state responsive to an input signal applied to said control input above said predetermined level; means for alternatively and selectively connecting said first terminal of said switching device to the other end of one of said start windings; means connecting said second terminal of said switching device to said second input lead; means coupled to the main winding of the induction motor for sensing the current therein and producing a signal in response to the current in said main winding to activate said semiconductor switching device to a high impedance state when the motor reaches a predetermined speed; means connecting said current sensing means to said control input of said switching device; and means for selectively applying a momentary input signal to said control input of said switching device when the direction of rotation of said rotor is to be reversed.

5. The starting and reversing circuit of claim 4 wherein said means for selectively applying a momentary input signal comprises a normally closed switch connected in series with one of said input leads, said normally closed switch being arranged to de-energize said main winding when opened.

6. The starting and reversing circuit of claim 5 wherein said current sensing means comprises a sensing winding inductively coupled with said main winding.

7. The starting and reversing circuit of claim 4 wherein said means for selectively applying a momentary input signal comprises a normally open switch connected between said control input and one of said terminals of of said switching device, said normally open switch being arranged to supply an input signal to said control input of said switching device when closed. When the motor comes up to operational speed the main winding current drops to a low level and thus the control signal drops below the predetermined level. The bidirectional semiconductor switching means then presents a very high impedance in the circuit of the start winding, effectively deenergizing it.

8. The starting and reversing circuit of claim 7 wherein said current sensing means comprises a sensing winding inductively coupled with said main winding.

9. A starting and reversing circuit for a single phase induction motor having a stator, a main winding positioned on said stator, a start winding, and a squirrel cage rotor operatively arranged for rotation relative to said stator, said circuit comprising: first and second input leads for connection to alternating current potential; means for connecting said input leads across said main winding; a bidirectional current conducting semiconductor switching device having first and second terminals that form a main current path and having a control input, said main current path being open in the absence of an input signal at said control input and being closed in response to an input signal applied to said control input; means for alternatively and selectively connecting one end of said start winding to said first input lead and the other end of said start winding to said first terminal of said switching device and for alternatively and selectively connecting said one end of said start winding to said first terminal of said switching device and said other end of said start winding to said first input lead thereby to reverse the direction of rotation of said motor; means connecting said second terminal of said switching device to said second input lead; means coupled to said induction motor for sensing the current in said main winding and producing a signal in response to the current in said main windig; means connecting said current sensing means to said control input of said switching device; and means for selectively applying a momentary input signal to said control input of said switching device to activate said switching device to a low impedance state when the direction of rotation of said motor is to be reversed.

10. The starting and reversing circuit of claim 9 wherein said means for selectively applying a momentary input signal comprises a normally closed switch connected in series with one of said input leads, said normally closed switch being arranged to de-energize said main winding when opened.

11. The starting and reversing circuit of claim 10 wherein said current sensing means comprises a sensing winding inductively coupled with said main winding.

12. The starting and reversing circuit of claim 9 wherein said means for selectively applying a momentary input signal comprises a normally open switch connected between said control input and one of said terminals of said switching device, said normally open switch being arranged to supply an input signal to said control input of said switching device when closed.

References Cited
UNITED STATES PATENTS

| | | | |
|---|---|---|---|
| 1,951,835 | 3/1934 | Morris | 318—207 |
| 2,539,857 | 1/1951 | Noodleman | 318—207 |
| 2,640,177 | 5/1953 | Wieseman | 318—207 |
| 3,414,789 | 12/1968 | Prouty | 318—227 |

ORIS L. RADER, Primary Examiner

G. RUBINSON, Assistant Examiner

U.S. Cl. X.R.

318—221, 227